(12) United States Patent
Powers

(10) Patent No.: US 11,148,074 B2
(45) Date of Patent: Oct. 19, 2021

(54) CLARIFIER WITH INDEPENDENT SUMP SCRAPER DRIVE

(71) Applicant: Kadant Black Clawson LLC, Lebanon, OH (US)

(72) Inventor: Paul J. Powers, Lebanon, OH (US)

(73) Assignee: Kadant Black Clawson LLC, Lebanon, OH (US)

( * ) Notice: Subject to any disclaimer, the term of this patent is extended or adjusted under 35 U.S.C. 154(b) by 0 days.

(21) Appl. No.: 16/615,174

(22) PCT Filed: Jun. 7, 2018

(86) PCT No.: PCT/US2018/036426
§ 371 (c)(1),
(2) Date: Nov. 20, 2019

(87) PCT Pub. No.: WO2018/226936
PCT Pub. Date: Dec. 13, 2018

(65) Prior Publication Data
US 2020/0171412 A1 Jun. 4, 2020

Related U.S. Application Data

(60) Provisional application No. 62/516,136, filed on Jun. 7, 2017.

(51) Int. Cl.
*B01D 21/20* (2006.01)
*B01D 21/06* (2006.01)
(Continued)

(52) U.S. Cl.
CPC ........... *B01D 21/06* (2013.01); *B01D 21/183* (2013.01); *B01D 21/20* (2013.01); *B01D 21/2427* (2013.01)

(58) Field of Classification Search
CPC ........ B01D 21/06; B01D 21/14; B01D 21/18; B01D 21/183; B01D 21/245; B01D 21/2472
(Continued)

(56) References Cited

U.S. PATENT DOCUMENTS 2,286,397 A 6/1942 Weiss et al.
2,528,051 A * 10/1950 Graner .................. B01D 21/18
210/531

(Continued)

FOREIGN PATENT DOCUMENTS

CN 2016027172 U 3/2017
KR 20150052489 A 5/2015
(Continued)

OTHER PUBLICATIONS

International Search Report and Written Opinion issued in related International Application No. PCT/US18/36426 dated Aug. 27, 2018, 7 pages.

(Continued)

*Primary Examiner* — Christopher Upton
(74) *Attorney, Agent, or Firm* — Wegman Hessler

(57) ABSTRACT

An improved clarifier tank having a rake arm assembly with one or more rake arms, a rake arm driveshaft operatively connected to the rake arms and a rake arm drive, and a sump scraper driveshaft, operatively connected to a plurality of sump scrapers and a sump scraper drive.

18 Claims, 4 Drawing Sheets

(51) Int. Cl.
 *B01D 21/18* (2006.01)
 *B01D 21/24* (2006.01)
(58) Field of Classification Search
 USPC .................................... 210/528, 531, 803
 See application file for complete search history.

(56) References Cited

U.S. PATENT DOCUMENTS

| | | | |
|---|---|---|---|
| 2,650,707 A * | 9/1953 | Scott .................... | B01D 21/06 210/531 |
| 3,833,126 A | 9/1974 | Schochet et al. | |
| 4,392,955 A | 7/1983 | Soriente | |
| 4,424,130 A | 1/1984 | King | |
| 8,641,909 B2 * | 2/2014 | Arbuthnot .............. | B01D 21/06 210/528 |
| 2007/0045202 A1 | 3/2007 | Peloquin et al. | |
| 2011/0272346 A1 | 11/2011 | Descamps et al. | |

FOREIGN PATENT DOCUMENTS

| | | |
|---|---|---|
| RU | 2514936 C2 | 5/2014 |
| SU | 1579526 A1 | 7/1990 |
| SU | 1666146 A1 | 7/1991 |
| UA | 22297 U | 4/2007 |
| UZ | 1012 U | 7/2015 |

OTHER PUBLICATIONS

Russian Office Action issued in connection with related RU Application No. 2019142451/05 dated Jun. 10, 2021, 4 pages long.

Russian Search Report issued in connection with related RU Application No. 2019142451/05 dated Jun. 8, 2021, 2 pages long.

Extended European Search Report for corresponding European Application No. 18813128.8 dated Jul. 14, 2021.

* cited by examiner

CLARIFIER WITH INDEPENDENT SUMP SCRAPER DRIVE

CROSS-REFERENCE TO RELATED APPLICATIONS

This application is a national phase of International Patent Application No. PCT/US2018/036426 filed Jun. 7, 2018, which claims the priority filing benefit of U.S. Provisional Application No. 62/516,136 filed Jun. 7, 2017, the entire disclosures of which are hereby incorporated herein by reference.

FIELD OF INVENTION

The present invention relates to an improved clarifier or sedimentation thickener tank, and more particularly, to an improved clarifier tank having a rake arm driveshaft operatively connected to a plurality of rake arms, and a sump scraper driveshaft, operatively connected to a plurality of sump scrapers.

BACKGROUND OF THE INVENTION

Clarifiers are commonly used in many industries to separate an influent flow containing solids materials into an underflow sludge or solids component and a clarified liquid phase. Clarifier tanks conventionally comprise a tank bounded by a concave cross-sectioned floor and upstanding wall member which together form an enclosure within which the clarification occurs via sedimentation principles. Rotatable rake members or the like rotate to scrape underflow, thickened sludge from the floor to an underflow drain or discharge line while clarified liquid at the top of the clarifier tank flows over a weir or the like for collection.

Many of the existing conventional sump scraper design has a number of deficiencies. These deficiencies include:
(1) The sump scrapers rotate at the same speed as the rake arms. As the tank diameter increases, the rake rotational speed decreases to maintain a desired tip speed at the sacrifice of the rotational speed of the sump scrapers. The optimum speed for the sump scrapers is not necessarily the same speed as the rake arms and should be faster than the rake arms.
(2) Rake torque is not always a good predictor of lime mud density in the sump since the majority of the torque is generated near the ends of the rake arms. There is currently no way to differentiate the torque on the sump scrapers versus the torque on the rake arms.
(3) The sump scrapers lift with the rake arms. When the sump scrapers lift, they no longer sweep in front of the inlet to the underflow pipe. This leads to erratic performance of the underflow, typically exhibited by swings in underflow density and flow. The term used in the industry to describe this condition is 'ratholing'. If the rakes remain lifted for a long period of time, the mud in the sump can become quite hard. The hard mud bed makes it difficult to lower the sump scrapers back into the sump.
(4) There are only a few inches of clearance between the ID of the sump and OD of the sump scrapers. If the sump scrapers are fully lifted out of the sump, it is possible for the sump scrapers to 'hang' on the top lip of the sump when lowering the rakes. This would occur if the steady post deflects/breaks or during other upset conditions.
(5) The steady post used to center the sump scrapers in the sump is not easily replaced once installed since the post is very long to accommodate the rake lift feature. Furthermore, lime mud can become packed inside the vertical shaft and above the steady post, preventing rake lowering.

SUMMARY OF THE INVENTION

In one exemplary embodiment, an improved clarifier tank is disclosed. The improved clarifier tank includes a rake arm assembly, comprising one or more rake arms, a rake arm driveshaft operatively connected to the rake arms and a rake arm drive, and a sump scraper driveshaft, operatively connected to a plurality of sump scrapers and a sump scraper drive.

In some embodiments, the sump scraper driveshaft is nested inside the rake arm driveshaft. In some embodiments, the sump scraper driveshaft and the rake arm driveshaft rotate at different speeds. In some embodiments, the sump scrapers and the rake arms rotate at different speeds. In some embodiments, the sump scraper driveshaft and the rake arm driveshaft rotate in different directions. In some embodiments, the sump scrapers and the rake arms rotate in different directions. In some embodiments, the sump scraper can be selected to rotate in either a clockwise or a counter-clockwise direction. In some embodiments, the sump scraper driveshaft and the rake arm driveshaft are driven by either mechanical or hydraulic reduction.

In yet another exemplary embodiment, an improved clarifier tank is provided. The improved clarifier tank comprises a rake arm assembly, comprising one or more rake arms; a rake arm driveshaft operatively connected to the rake arms and a rake arm drive; a sump scraper driveshaft, operatively connected to a plurality of sump scrapers and a sump scraper drive; and a rake arm lift device.

In some embodiments, the rake arms and the sump scrapers are separate and distinct from one another. In some embodiments, the sump scraper driveshaft is nested inside the rake arm driveshaft. In some embodiments, the rake arm lift device lifts the rake arm drive shaft and the rake arms without raising the sump scraper driveshaft. In some embodiments, the rake arm lift device is a dual hydraulic piston. In some embodiments, the rake arm lift device is an electric screw assembly. In some embodiments, the rake arms and the sump scrapers are operatively connected through a slide coupling mechanism. In some embodiments, the slide coupling mechanism allows for the rake arms to move up-and-down, while still allowing the sump scrapers to remain in a fixed position.

In yet another exemplary embodiments, an improved clarifier rank comprises a rake arm system, comprising one or more rake arms, a rake arm driveshaft, and a rake arm drive, wherein the rake arm system is top driven; and a sump scraper system, comprising a plurality of sump scrapers, a sump scraper driveshaft and a sump scraper drive, wherein the sump scraper system is bottom driven.

In some embodiments, the rake arm system is separate and independent from the sump scraper drive system. In some embodiments, the rake arm driveshaft is operatively connected to the rake arms and the rake arm drive. In some embodiments, the sump scraper driveshaft is operatively connected to the sump scrapers and the sump scraper drive, wherein the sump scraper driveshaft extends from the bottom of the clarifier tank. In some embodiments, the rake arms and the sump scrapers rotate independently of one another. In some embodiments, the rake arms and the sump scrapers are operatively connected through a slide coupling mechanism. In some embodiments, the slide coupling mechanism allows for the rake arms to move up-and-down, while still allowing the sump scrapers to remain in a fixed position.

In yet another exemplary embodiment, a drive system for a clarifier tank is provided. The drive system comprises a drive assembly, wherein the drive assembly comprises, a drive shaft, one or more rake arms, and a plurality of sump scrapers, wherein the rake arms and the sump scrapers are operatively connected to the drive shaft through a slide coupling mechanism.

In some embodiments, the rake arms and the sump scrapers are driven by the drive assembly. In some embodiments, the rake arms and the sump scrapers are rotated at the same speed. In some embodiments, the slide coupling mechanism allows for the rake arms to move up-and-down, while still allowing the sump scrapers to remain in a fixed position.

DETAILED DESCRIPTION

Figure 1:
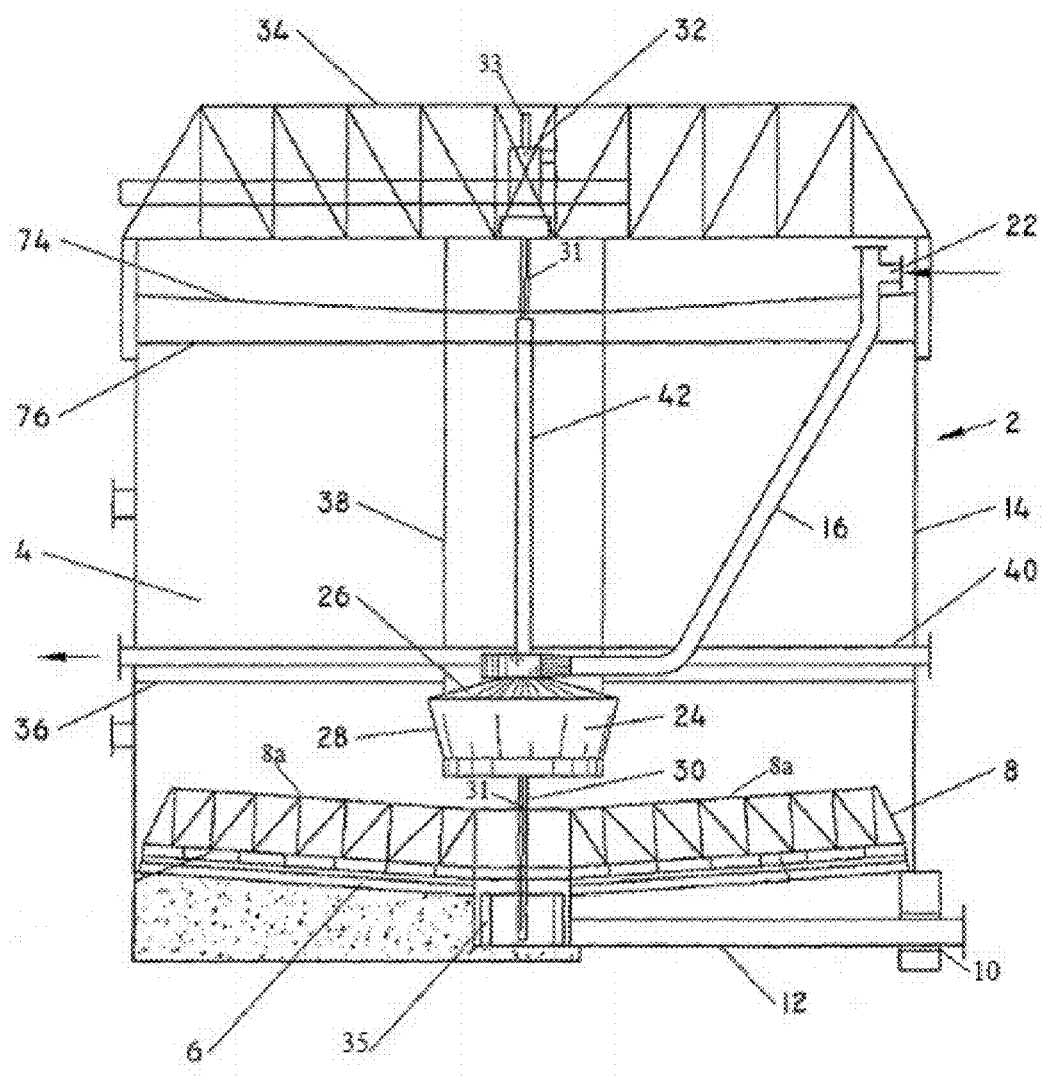
FIG. 1 is a schematic cross-sectional view of a unit storage clarifier tank in accordance with the present invention.

Turning first to FIG. 1 of the application, a clarifier unit 2 of the type commonly used in the clarification of green liquor in a recausticizing process is shown. It is noted that this unit's storage type clarifier tank differs from a standard clarifier tank by having storage capacity for clarified liquid. It should be understood by a person of ordinary skill in the art that the term clarifier and sedimentation thickener can be used interchangeably.

The clarifier unit 2 includes a tank 4 having a continuous wall member 14 and a bottom 6. The wall and bottom define a volume enclosure within which a liquid containing solids particulate matter is separated into clarified liquid and liquid/solid phases. As shown, the bottom 6 is concave in cross-section with the nadir of the bottom terminating in a drain 10 and associated drain line 12 through which solids, underflow material will be removed.

An influent pipe 16 is provided in communication with inlet 22 to provide influent feed to a feedwell 24. As shown, the feedwell is of the type having a roof 26 and continuous wall 28 depending therefrom to form a feedwell enclosure. It should be understood by one skilled in the art that the feedwell 24 may include any conventional feedwell design and may include a number of additional features.

The clarifier unit 2 of the present invention includes two separate drive shafts, a rake arm drive shaft 30 and a sump scraper drive shaft 31, whereas the sump scraper drive shaft 31 is nested within the rake arm drive shaft 30. In some embodiments, the rake arm drive shaft 30 encompasses the sump scraper drive shaft 31. In other embodiments, the rake arm drive shaft 30 includes an internal sleeve, where having an internal opening adapted to fit over said sump scraper drive shaft 31. In other embodiments, the sump scraper drive shaft 31 is encapsulated by the rake arm drive shaft 30 by other conventional means.

As shown in FIG. 1, a rake assembly 8 is operatively connected to the rake arm drive shaft 30. The rake assembly 8 generally comprises one or more rake arms 8a which rotate about the central axis of the tank 4. The rake arms 8a are attached to the rake arm drive shaft 30 so as to rotatably scrape the underflow sludge from the bottom of the tank. Additionally, the sump scraper drive shaft 31 is operatively connected to a plurality of sump scrapers 35.

In some embodiments, the rake arm drift shaft 30 is driven via the rake arm drive 32 that may be, as is shown in FIG. 1, supported by bridge member 34. Stabilizer cables 36 and 38 suspend the feedwell from the tank and the bridge member respectively. A weir 40 is provided to collect clarified liquor. Further, the clarifier unit may be provided with a vent line 42, coaxially disposed about the shaft 30. A roof 74 is provided over the tank and, as shown, the liquor level in the tank is shown at 76.

In some embodiments, the rake arm drive shaft 30 is operatively connected to a rake arm drive 32, and the sump scraper drive shaft 31 is operatively connected to a sump scraper drive 33. These separate drives can be separately driven by either mechanical or hydraulic reduction, or alternatively, by means of the like.

Figure 2:
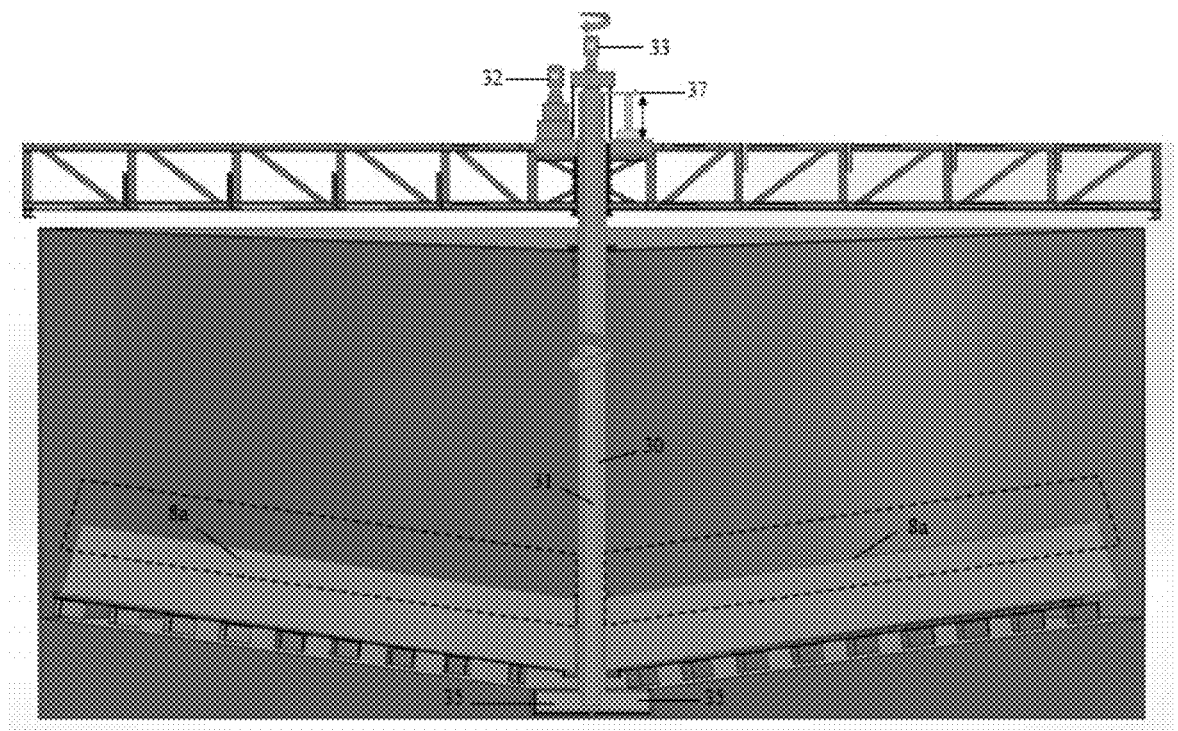
FIG. 2 is a schematic cross-sectional view of a unit storage clarifier tank depicting the configuration of two separate drive shafts with drives in accordance with an embodiment of the present invention.

Referring now to FIG. 2, the rake arm drive shaft 30 is operatively connected to a rake arm lift device 37. The rake arm lift device 37 provides a lifting feature that allows for the rake arms 8a to lift or be raised independently. In some embodiments, the rake arm lift device 37 is a dual hydraulic piston, or the like. As such, the rake arms 8a, including the rake arm drive shaft 30, can be raised without raising the sump scraper drive shaft 31 or the sump scrapers 35. One advantage of providing the separate rake arm drive 32 and a separate sump scraper drive 33 is that each can be run at optimized speeds and yet still allow the sump to remain agitated even while the rake arm lift device is in operation.

In some embodiments, the sump scrapers 35 can be rotated at a different speed than the rake arms 8a. In some embodiments, the sump scrapers 35 are rotated at a faster speed than the rake arms 8a. By optimizing the speed of the rake arms 8a, it allows additional thickening to take place and maintain a more uniform, homogenous density in the sump. In some embodiments, torque feedback direct from the sump scrapers 35 can be used to optimize underflow density control.

In some embodiments, the sump scrapers 35 are able to rotate in either a clockwise or counterclockwise direction. Depending on the 'fish mouth' orientation of the underflow pipes, the ability to rotate in either direction is beneficial to better distribute wear on the sump scrapers 35.

In some embodiments, the rake arms 8a and the sump scrapers 35 are separate and distinct from one another. Because the rake arms 8a and the sump scrapers 35 are separate and distinct from one another, one advantage is that the sump scrapers 35 will no longer lift with the rake arms 8a. This advantage gives the operators the ability to better utilize the mud storage capacity of the thickener while simultaneously keeping the sump scrapers sweeping in front of the inlet to the underflow pipe at all times to prevent ratholing. This is particularly important under upset conditions that may cause the rake arms to raise quickly and unexpectedly (e.g. slaking large quantities of purchased lime, overliming, interruption in downstream operations, etc.). Because the sump scrapers 35 will no longer lift with the rake arms 8a, it also eliminates the issues of having to lower the sump scrapers into a hard mud bed in the sump or having the sump scrapers hang on the edge of the sump during rake arm lowering.

Figure 3:
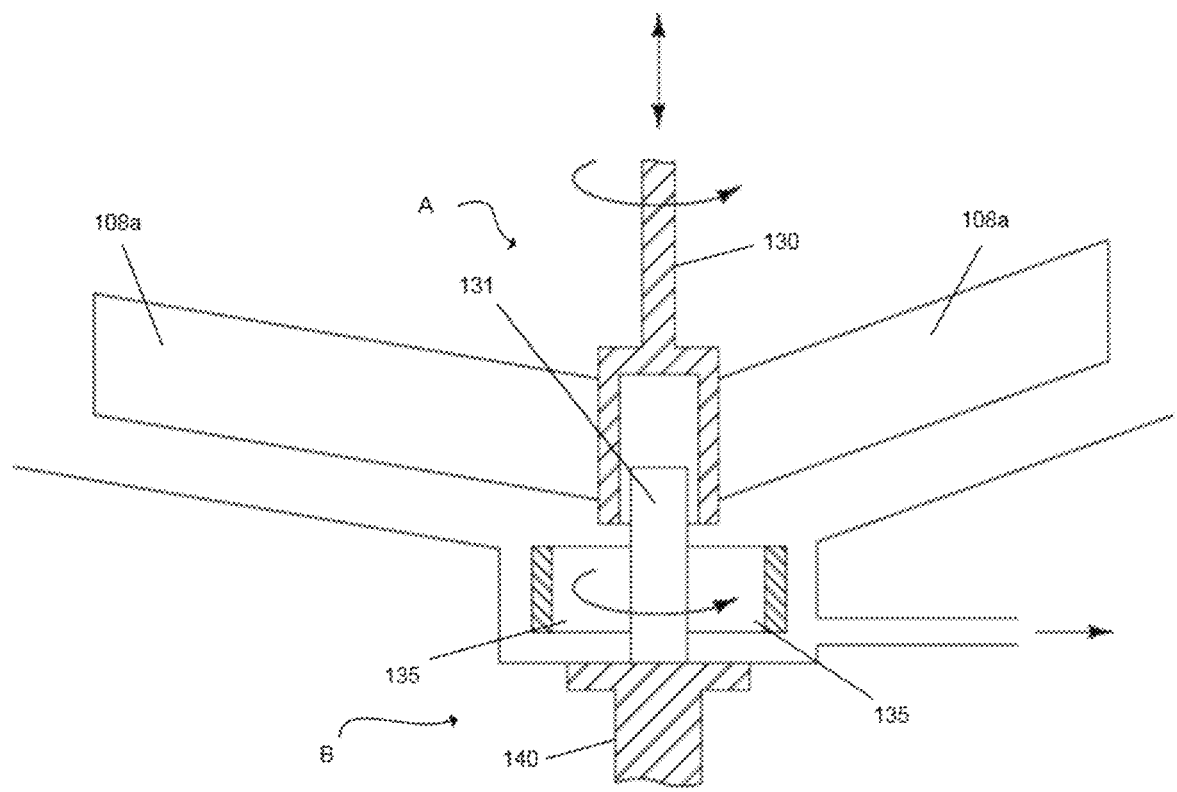
FIG. 3 is schematic cross-sectional view of an improved clarifier tank in accordance with an illustrative embodiment of the disclosed technology.

In a preferred embodiment, the clarifier comprises a rake arm system A (which is top driven), and a sump scraper system B (which is bottom driven). As shown in FIG. 3, where like parts have like numerals to those in FIGS. 1 and 2, plus 100, the rake arm system A provides the rake arms 108a, the rake arm drive shaft 130, and a rake arm drive (not shown in figure). The sump scraper system B provides the sump scrapers 135, the sump scraper drive shaft 131, and an independent and separate sump scraper drive 140, which is located at and driven from the bottom of the clarifier. The sump scraper drive 140 is operatively connected to the sump scraper drive shaft 131, where the sump scraper drive shaft 131 extends from the bottom of the clarifier. In some embodiments, the sump scraper drive 140 may also act as a steady post for the top driven, rake arm drive system.

In some embodiments, the rake arms 108a are operatively connected to a rake arm drive shaft 130, and the sump scrapers 135 are operatively connected to a sump scraper drive shaft 131, allowing for the rake arms 108a and the sump scrapers 135 to rotate independently of one another.

Figure 4:
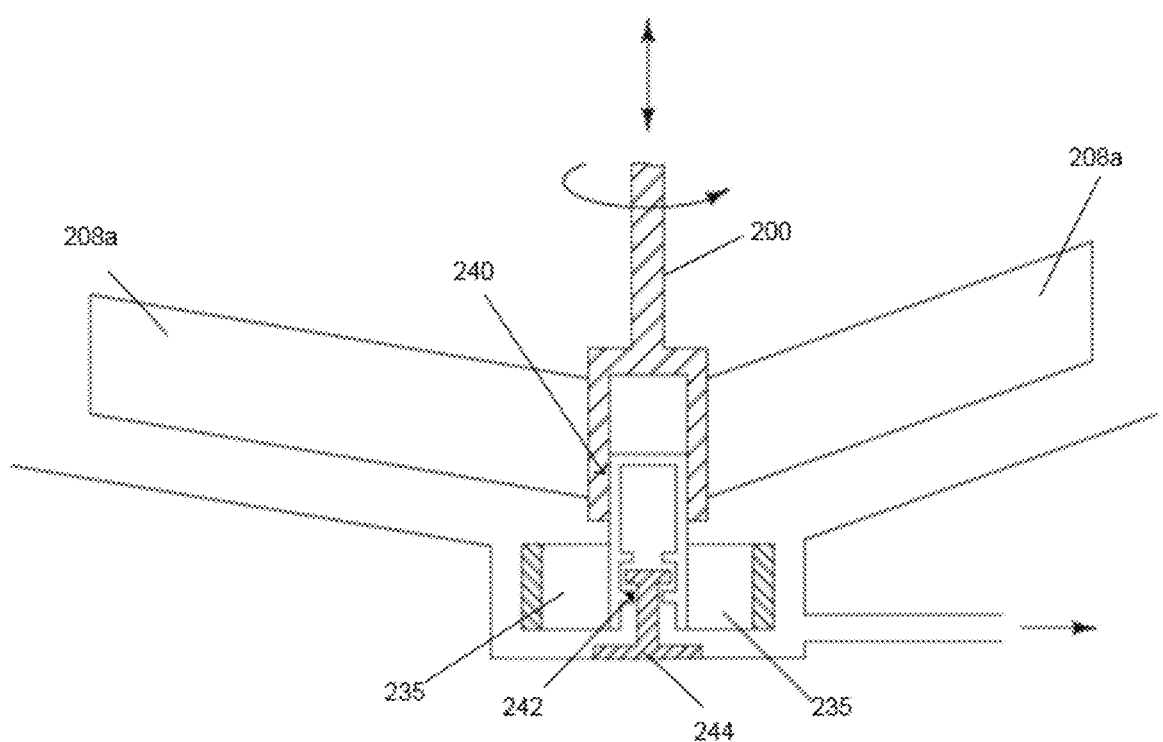
FIG. 4 is schematic cross-sectional view of an improved clarifier tank in accordance with an illustrative embodiment of the disclosed technology.

In yet another preferred embodiment, the sump scrapers can be rotated at the same speed as the rake arms, but yet the sump scrapers do not lift with the rake arms. As shown in FIG. 4, where like parts have like numerals to those in FIGS. 1-3, plus 100, in some embodiments, the improved clarifier includes a single drive assembly comprising a drive shaft 200, where the rake arms 208a and sump scrapers 235 are operatively connected to the drive shaft 200 through a slide coupling 240. The single drive assembly further comprises a steady post 242 and a sump scraper retainer 244.

In some embodiments, the rake arms 208a and the sump scrapers 235 are driven by the single drive assembly and are rotated at the same speed. The slide coupling 240 allows for the rake arms 208a to move up-and-down to adjust to varying mud levels, yet still allows the sump scrapers 235 to remain in a fixed position and rotate at the same speed as the rake arms 208a. During operation of or the up-and-down movement of the rake arms 208a, the sump scrapers 235 remain locked in place, where the combination of the steady post 242 and the sump scraper retainer 244 provide a steady post feature that retain the sump scrapers 235 in place.

While certain embodiments of the invention have been shown and described herein, it is intended that there be covered as well any change or modification therein which may be made without departing from the spirit and scope of the invention as defined in the appended claims.

The invention claimed is:

1. An improved clarifier tank, comprising:
a rake arm assembly, comprising one or more rake arms;
a rake arm driveshaft operatively connected to said rake arms and a rake arm drive; and
a sump scraper driveshaft, operatively connected to a plurality of sump scrapers and a sump scraper drive,
wherein said sump scraper drive is independent of said rake arm drive.

2. The clarifier tank as in claim 1, wherein said sump scraper driveshaft and said rake arm driveshaft rotate at different speeds.

3. The clarifier tank as in claim 1, wherein said sump scrapers and said rake arms rotate at different speeds.

4. The clarifier tank as in claim 1, wherein said sump scraper driveshaft and said rake arm driveshaft rotate in different directions, and wherein said sump scrapers and said rake arms rotate in different directions.

5. The clarifier tank as in claim 1, wherein said sump scraper can be selected to rotate in either a clockwise or a counterclockwise direction.

6. The clarifier tank as in claim 1, wherein said sump scraper driveshaft and said rake arm driveshaft are driven by either mechanical or hydraulic reduction.

7. An improved clarifier tank, comprising:
a rake arm assembly, comprising one or more rake arms;
a rake arm driveshaft operatively connected to said rake arms and a rake arm drive;
a sump scraper driveshaft, operatively connected to a plurality of sump scrapers and a sump scraper drive; and
a rake arm lift device,
wherein said sump scraper drive is independent of said rake arm drive.

8. The clarifier tank as in claim 7, wherein said rake arms and said sump scrapers are separate and distinct from one another.

9. The clarifier tank as in claim 7, wherein said rake arm lift device lifts said rake arm drive shaft and said rake arms without raising said sump scraper driveshaft.

10. The clarifier tank as in claim 7, wherein said rake arm lift device is a dual hydraulic piston, or an electric screw assembly.

11. The clarifier tank as in claim 7, wherein said rake arms and said sump scrapers are operatively connected through a slide coupling mechanism, wherein said slide coupling mechanism allows for said rake arms to move up-and-down, while still allowing said sump scrapers to remain in a fixed position.

12. An improved clarifier tank, comprising:
a rake arm system, comprising one or more rake arms, a rake arm driveshaft, and a rake arm drive, wherein said rake arm system is top driven; and
a sump scraper system, comprising a plurality of sump scrapers, a sump scraper driveshaft and a sump scraper drive, wherein said sump scraper system is bottom driven.

13. The clarifier tank as in claim 12, wherein said rake arm system is separate and independent from said sump scraper drive system.

14. The clarifier tank as in claim 12, wherein the rake arm driveshaft is operatively connected to said rake arms and said rake arm drive.

15. The clarifier tank as in claim 12, wherein said sump scraper driveshaft is operatively connected to said sump scrapers and said sump scraper drive, wherein said sump scraper driveshaft extends from the bottom of the clarifier tank.

16. The clarifier tank as in claim 12, wherein said rake arms and said sump scrapers rotate independently of one another.

17. The clarifier tank as in claim 12, wherein said rake arms and said sump scrapers are operatively connected through a slide coupling mechanism, wherein said slide coupling mechanism allows for said rake arms to move up-and-down, while still allowing said sump scrapers to remain in a fixed position.

18. A drive system for a clarifier tank, the drive system comprising:
a drive assembly, wherein said drive assembly comprises, a drive shaft, one or more rake arms, and a plurality of sump scrapers, wherein said rake arms and said sump scrapers are operatively connected to said drive shaft through a slide coupling mechanism, wherein said slide coupling mechanism allows for said rake arms to move up-and-down, while still allowing said sump scrapers to remain in a fixed position.

* * * * *